United States Patent [19]
Kondoh et al.

[11] Patent Number: 5,123,884
[45] Date of Patent: Jun. 23, 1992

[54] PLANETARY SPEED CHANGING DEVICE

[75] Inventors: Masatoshi Kondoh, Obu, Japan; Toyoshi Maruo, Chesapeake, Va.

[73] Assignee: Sumitomo Heavy Industries, Ltd., Tokyo, Japan

[21] Appl. No.: 581,623

[22] Filed: Sep. 12, 1990

[51] Int. Cl.$^5$ .............................................. F16H 1/28
[52] U.S. Cl. ..................... 475/179; 475/168; 475/178; 464/89
[58] Field of Search ............... 475/162, 168, 176, 178, 475/179; 464/89, 102, 105; 418/61.3

[56] References Cited

U.S. PATENT DOCUMENTS

| | | | |
|---|---|---|---|
| 2,970,694 | 2/1961 | Klyce | 464/89 X |
| 3,160,032 | 12/1964 | Black | 475/178 X |
| 3,424,036 | 1/1969 | Colgan | 475/178 |
| 3,726,158 | 4/1973 | Brown | 475/179 X |
| 4,183,267 | 1/1980 | Jackson | 475/179 |
| 4,478,100 | 10/1984 | Sfredda | 475/162 X |
| 4,552,037 | 11/1985 | Distin, Jr. et al. | 475/159 |
| 4,567,790 | 2/1986 | Butterfield et al. | 475/179 X |
| 4,843,911 | 7/1989 | Minegishi et al. | 475/162 X |

FOREIGN PATENT DOCUMENTS

| | | | |
|---|---|---|---|
| 0087743 | 9/1983 | European Pat. Off. | |
| 0129454 | 7/1985 | Japan | 475/178 |
| 0002947 | 1/1986 | Japan | 475/178 |
| 955097 | 4/1964 | United Kingdom . | |
| 2117081A | 10/1983 | United Kingdom . | |

OTHER PUBLICATIONS

Patent Abstracts of Japan, vol. 11, No. 105, Apr. 3, 1987, & JP-A-61-252934, Nov. 10, 1986.

*Primary Examiner*—Richard Lorence
*Assistant Examiner*—Benjamin Levi
*Attorney, Agent, or Firm*—Armstrong, Nikaido, Marmelstein, Kubovcik & Murray

[57] ABSTRACT

A planetary speed changing device has an input shaft to which a torque is transmitted from an external device, an output shaft from which a torque of a reduced speed is output, eccentric members coupled to the input shaft through a flexible coupler which permits a relative radial displacement between the input shaft and the eccentric members, a plurality of externally toothed gears fitted on the eccentric members, an internally toothed gear having internal teeth formed by outer pins and meshing with the teeth of the externally toothed gears, inner pin receiving holes formed in the externally toothed gears, inner pins loosely received in the inner pin receiving holes, inner pin holder rings having holes tightly receiving the inner pins, and coupling means for coupling the inner pin holder rings to an output shaft. The inner pin holder rings are arranged on both sides of the combination of the externally toothed gears, and thrust bearings are provided between each the inner pin holder rings and the eccentric members.

2 Claims, 4 Drawing Sheets

PLANETARY SPEED CHANGING DEVICE

BACKGROUND OF THE INVENTION

1. Field of the Invention

The present invention relates to a planetary speed changing device in which causes of oscillation of input shaft are removed to eliminate any abnormal wear of parts, while suppressing noise and vibration.

2. Description of the Related Art

Hitherto, various speed changing devices incorporating internal-meshing type planetary gear mechanism have been proposed. Among these proposed speed changing devices, a device called cyclo cycloidal speed reducer (registered trademark) is well known. This type of speed changing device has an internally toothed gear with teeth formed by pins or combinations of pin and roller, and an externally toothed gear having trochoidal teeth formed by epitrochoidal parallel curves. The externally toothed gear have inner pins or inner rollers which are loosely fitted therein. The externally toothed gear is rotated by a rotation of an eccentric member fitted in the externally toothed gear so as to revolve along the inner periphery of the internally toothed gear, thereby outputting a torque at a speed which is reduced from the input rotation speed. This type of speed changing device is widely used in various fields, because it can transmit a large torque and because it provides a large speed reducing ratio.

An example of such cyclo cycloidal speed reducer will be explained with reference to FIG. 3. The illustrated speed changing device is arranged such that a reduced rotation speed is obtained at an output shaft 2 when a torque is input through an input shaft 1. This device, however, can be used such that the output shaft 2 is fixed so that a rotation output of a reduced speed is obtained through an internally toothed gear.

A hollow eccentric shaft 3 is fixed to the input shaft 1 by means of a key (not shown) and a key groove 4. The eccentric shaft 3 carries two eccentric members $3_1$ and $3_2$. Externally toothed gears $5_1$ and $5_2$ are fitted on the eccentric members $3_1$ and $3_2$ through rollers 6. Each of the externally toothed gears $5_1$ and $5_2$ has teeth 7 having trochoidal shape and formed on the outer periphery thereof. An internally toothed gear 8, which serves also as an output casing, is fixed in this case. The internally toothed gear 8 has arcuate teeth provided by outer pins 9 and meshing with the teeth of the externally toothed gears $5_1$, $5_2$. Each outer pin 9 may carry an outer roller. The externally toothed gears have inner pin-receiving bores 10 which loosely receive inner pins 11 on which are loosely fitted inner rollers. Each of the inner pins is closely fitted in a hole formed in an inner pin holding flange 13. The inner roller 12, however, is not essential and may be omitted. In the illustrated device, the inner pin holding flange 13 is formed integrally with the output shaft 2.

Casings $14_1$ and $14_2$ are united together with the internally toothed gear 8 clamped therebetween. A pair of input shaft bearings $15_1$ and $15_2$, which are for supporting the input shaft 1, are provided on both sides of the combination of the externally toothed gears $5_1$ and $5_2$. The input shaft bearing $15_1$ is disposed between the outer periphery of the input shaft 1 and the casing $14_1$, while the input shaft bearing $15_2$ is provided between the outer peripheral surface of the input shaft 1 and the surface of a recess $13_1$ formed in the inner pin holding flange 13. A pair of output bearings $16_1$, $16_2$ are disposed between the outer peripheral surface of the output shaft 2 and the casing $14_2$.

In operation, rotation of the input shaft 1 causes the eccentric members $3_1$ and $3_2$ to rotate. Since the externally toothed gears $5_1$ and $5_2$ are prevented from rotating about their own axes due to the presence of inner pins 11 received in the holes 10, these externally toothed pins $5_1$ and $5_2$ are caused to orbit at a radius e. If the difference between the number of the teeth on each externally toothed gear $5_1$, $5_2$ and the number of outer pins 9, i.e., the number of teeth on the internally toothed gear 8 is one, the mesh between the outer teeth 7 on the externally toothed gears $5_1$, $5_2$ and the outer pins 9 as the teeth of the internally toothed gear 8 is offset by one pitch of the teeth. Consequently, the rotation of the input shaft 1 is transmitted to the output shaft through the inner pins 11, with the rotation speed reduced to 1/n (n being the number of teeth of each externally toothed gear $5_1$, $5_2$) due to the meshing between the externally toothed gears $5_1$, $5_2$ and the internally toothed gear 8.

This known planetary speed reducing device suffers from the following problems.

A discussion will be made as to the manner in which the input shaft 1 and the output shaft 2 are loaded, with specific reference to FIG. 4. As shown in this Figure, the rotational load W1 applied by the input shaft 1 to the output shaft 2 acts at the end of the input shaft bearing $15_2$. On the other hand, the load W2 applied by the externally toothed gears (omitted from FIG. 4) to the output shaft 2 acts on the inner pin 11. At the same time, the load $W_3$ applied by the externally toothed gears to the input shaft 1 acts on the input shaft 1 as illustrated. Thus, the loads $W_1$ and $W_2$ applied to the output shaft 2 act on points which are on the same side of the output shaft bearings $16_1$, $16_2$ as the input shaft 1, so that the output shaft 2 receive these loads in a cantilevered manner. Consequently, a moment is produced to cause the axis of the output shaft 2 to be inclined at an angle $\beta$ to the axis $O_1$ of the shaft under no load.

On the other hand, the load $W_3$ applied to the input shaft 1 acts to produce a moment which, in combination with the inclination of the output shaft 2, causes the input shaft 1 to be inclined at an angle $\beta$ to the axis $O_1$.

Consequently, both the input and output shafts rotate with their axes deviated from the axis of rotation, resulting in problems such as extraordinary wear of parts and generation of noise and vibration.

Referring now to FIG. 5, when a radial load F is applied from the exterior to the input shaft 1, the input shaft 1 is inclined at an angle $\beta'$ with respect to the original axis $O_1$, while the output shaft 2 also is inclined at an angle $\alpha'$ with respect to the original axis $O_1$, thus causing abnormal wear and generation of vibration and noise.

The inclinations of the output shaft 2 and the input shaft 1 are attributable to the fact that the input shaft 1 receives the load $W_3$ from the externally toothed gears $5_1$, $5_2$ and that the load $W_3$ is supported by the input bearings $15_1$ and $15_2$.

In the known planetary speed changing device described above, the balance of load is attained when torque is equally distributed to both externally toothed gears $5_1$ and $5_2$. However, since these two externally toothed gears are not disposed on the same plane, a moment is produced to act on the eccentric members 3 or the input shaft 1 by the loads acting on the externally toothed gears $5_1$, $5_2$. It has therefore been necessary to provide input shaft bearings $15_1$, $15_2$ for supporting the input shaft 1. The moment acting on the input shaft 1 is the product of the force acting on the externally toothed gears $5_1$, $5_2$ and the distance between the externally toothed gears $5_1$ and $5_2$. The externally toothed gears $5_1$ and $5_2$ are supported by the eccentric members 3 and the rollers 6. These eccentric members 3 and the rollers 6 are required to have certain minimum lengths from the view point of load capacity. Thus, there is a practical limit in the reduction of the space between two externally toothed gears $5_1$ and $5_2$.

SUMMARY OF THE INVENTION

Accordingly, an object of the present invention is to provide a planetary speed changing device in which the causes of inclination of the input shaft are eliminated to avoid problems such as abnormal wear of parts and generation of vibration and noise.

To this end, according to one aspect of the present invention, there is provided a planetary speed changing device comprising: an input shaft; eccentric members coupled to the input shaft through a flexible coupler which permits a relative radial displacement between the input shaft and the eccentric members; a plurality of externally toothed gears fitted on the eccentric members; an internally toothed gear having internal teeth formed by outer pins and meshing with the teeth of the externally toothed gears; inner pin receiving holes formed in the externally toothed gears; inner pins loosely received in the inner pin receiving holes; inner pin holder rings arranged on both sides of the combination of the externally toothed gears and having holes tightly receiving the inner pins; coupling means for coupling the inner pin holder rings to an output shaft; and thrust bearings provided between each the inner pin holder rings and the eccentric members.

DESCRIPTION OF THE PREFERRED EMBODIMENTS

Figure 1:
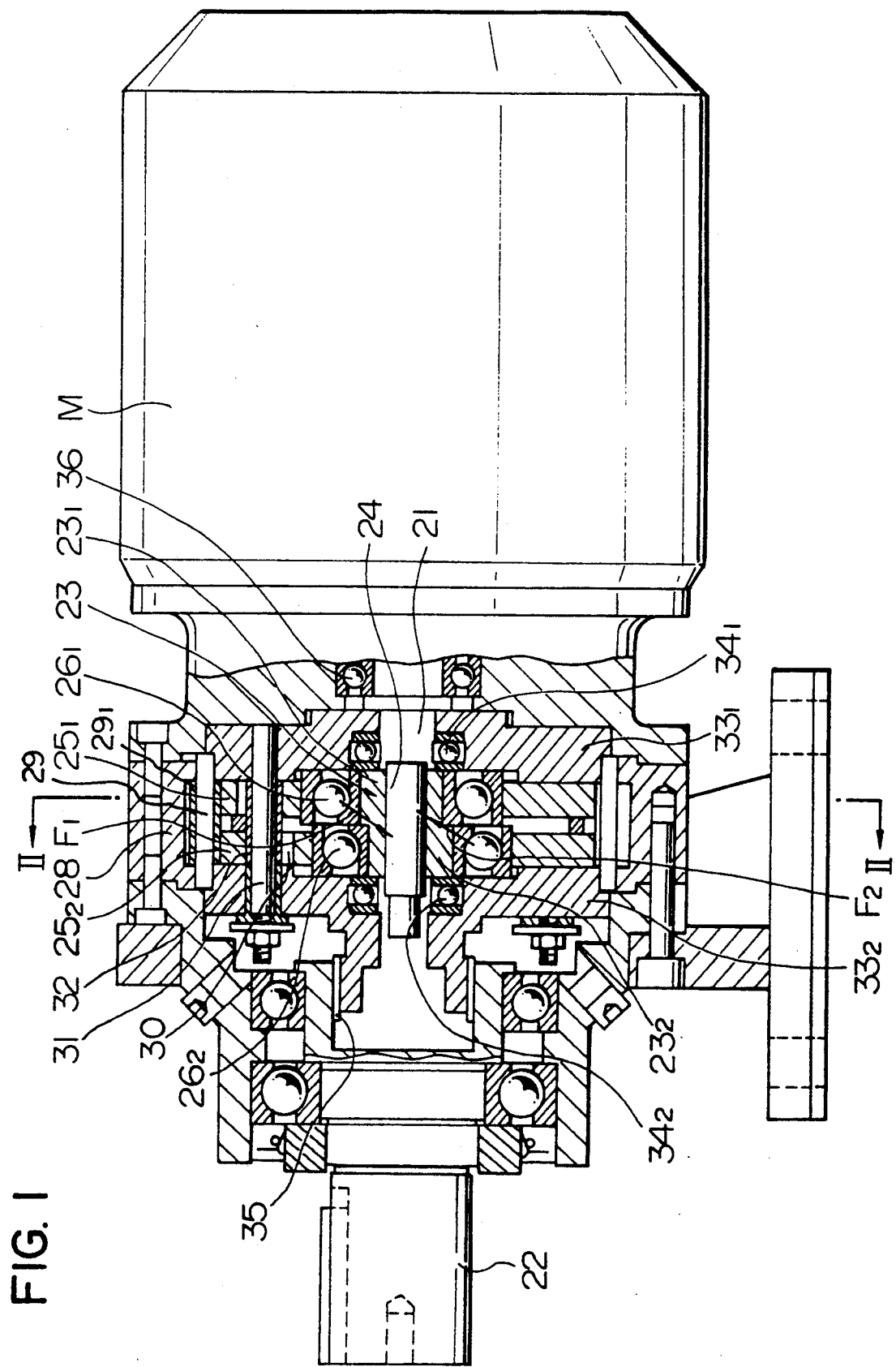
FIG. 1 is a sectional view of an embodiment of the present invention.
Figure 2:
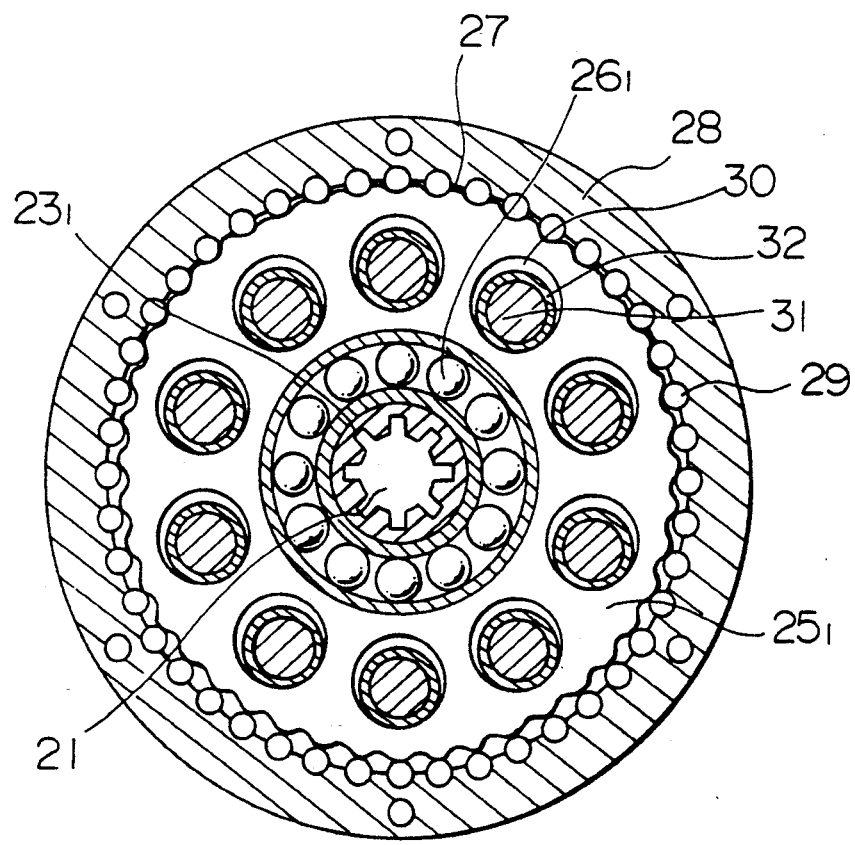
FIG. 2 is a sectional view taken along the line II—II of FIG. 1.
Figure 3:
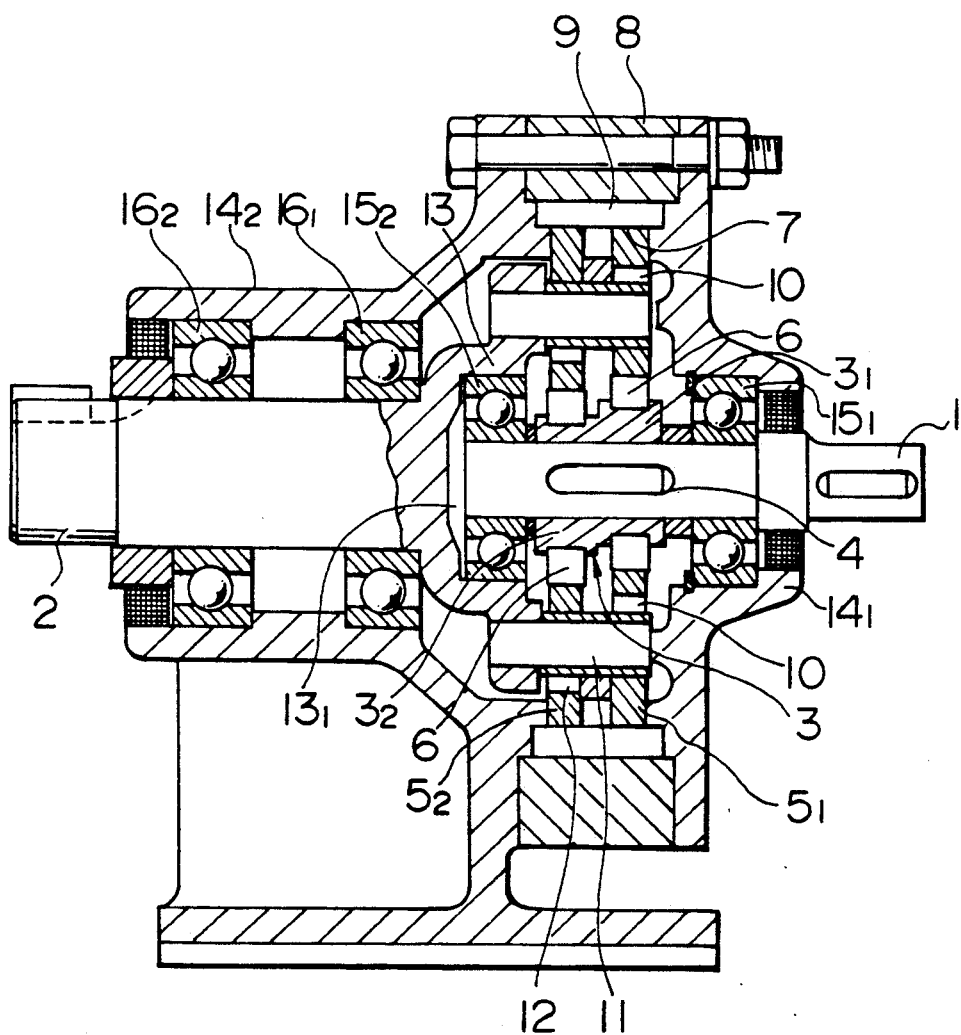
FIG. 3 is a sectional view of a known planetary speed reducing device.
Figure 4:
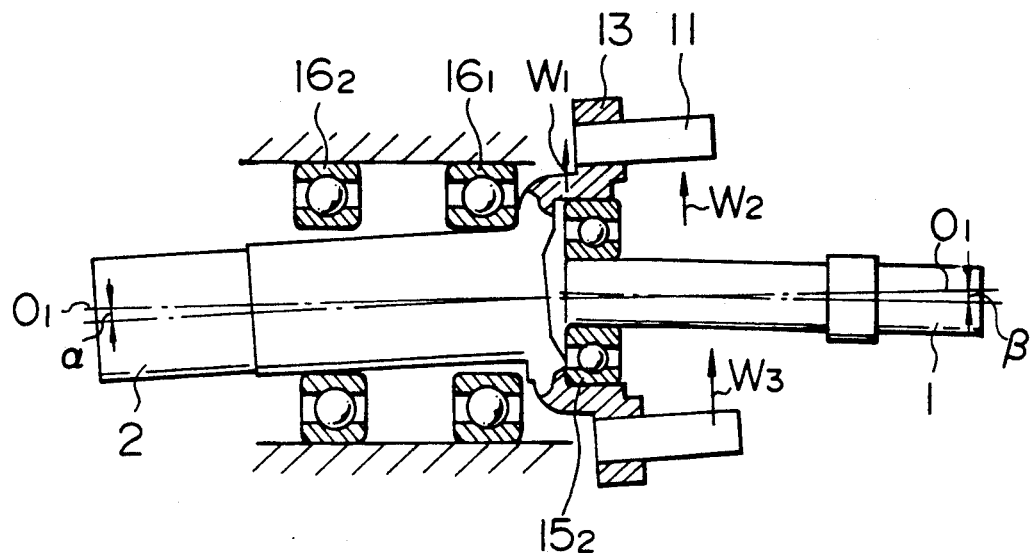
FIG. 4 is a schematic illustration showing points of action of the torque load and consequent inclinations of the input shaft and the output shaft in the known planetary speed reducing device.
Figure 5:
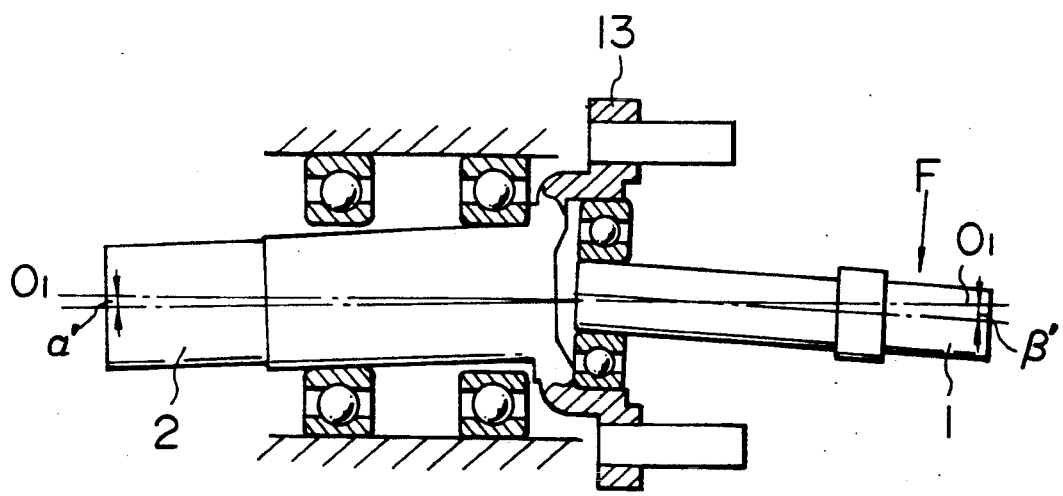
FIG. 5 is a schematic illustration of inclinations of output and input shafts caused by application of external force.

Referring to FIGS. 1 and 2, there is shown a planatary speed changing device embodying the present invention in which rotation of an input shaft 21 is output as a rotation of a reduced speed from an output shaft 22. This, however, is not exclusive and the embodiment may be used such that the rotation of a given speed is input to the output shaft 22 and a rotation of an increased speed is taken out from the input shaft 21.

A hollow eccentric shaft 23 is mounted on the input shaft 21 and is coupled to the input shaft 21 through a flexible coupling means 24 capable of absorbing any radial displacement such as a spline coupler or an Oldham's mechanism. A pair of eccentric members $23_1$, $23_2$ are formed on the eccentric shaft 23. Externally toothed gears $25_1$, $25_2$ are mounted on the eccentric members $23_1$, $23_2$ through angular bearings $26_1$, $26_2$. The angular bearings $26_1$, $26_2$ are composed of ball bearings or roller bearings and have functions to bear both axial and radial loads. These angular bearings $26_1$, $26_2$ are arranged such that they bear forces $F_1$, $F_2$ of opposite directions. The externally toothed gears $25_1$, $25_2$ have external teeth 27 having a trochoidal teeth shape. An internally toothed gear 28 is formed as a unit with the casing. The internally toothed gear 28 has arcuated teeth provided by outer pins 29 which engage with the teeth of the externally toothed gears $25_1$, $25_2$. An external roller $29_1$ is loosely mounted on the outer pin 29. The use of external rollers $29_1$, however, is not essential. The externally toothed gears $25_1$, $25_2$ are provided with inner pin receiving bores 30 which loosely receive inner pins 31. An inner roller 32 loosely fits on each inner pin 31. The inner pins 31 closely fit in bores formed in inner pin holder rings $33_1$, $33_2$ so as to be held by these rings. The use of the inner roller 32, however, is not essential. The inner pin holder rings $33_1$, $33_2$ are arranged on both sides of the externally toothed gears $25_1$, $25_2$. Thrust bearings $34_1$, $34_2$ are provided between the inner pin holder rings $33_1$, $33_2$ and the eccentric members $23_1$, $23_2$. One $33_2$ of the inner pin holder rings is connected to the output shaft 22 not directly but through a flexible coupling mechanism 35 capable of absorbing offset of axis, e.g., a spline coupler.

In this embodiment, the output shaft of a driving motor M is used as the input shaft 21. No bearing is used for supporting the input shaft 21, except the bearing 36 adjacent the motor M.

The following actions are performed during the operation of the embodiment having the described construction.

A moment is produced to act on the eccentric shaft 23 by the loads exerted by the externally toothed gears $25_1$, $25_2$. According to the invention, this moment is borne by the thrust bearings $34_1$, $34_2$ which are provided on both sides of the eccentric members $23_1$, $23_2$, thus eliminating necessity for radial bearings which would bear this moment. This arrangement is one of the remarkable features of the invention. Furthermore, no radial load is transmitted from the eccentric shaft 23 to the input shaft 21 by virtue of the fact that the eccentric shaft 23 and the input shaft 21 are coupled by a radially displaceable joint such as a spline coupler or an Oldham's ring. Consequently, the input shaft 21 receives only a torsional load produced by the torque which is being transmitted, and receives no radial load, with the result that vibration and noise due to oscillation of the input shaft 21 are eliminated. In addition, bearings for supporting the input shaft 21 are made smaller or may be omitted.

In addition, since the externally toothed gears $25_1$, $25_2$ are supported by angular bearings $26_1$, $26_2$ which are arranged in a face-to-face relation, i.e., such that the lines indicating the forces acting on these bearings are inclined to oppose each other as indicated at $F_1$ and $F_2$, the span between these two externally toothed gears $25_1$, $25_2$ is substantially shortened to reduce the moment.

The above-described face-to-face arrangement of the angular bearings $26_1$, $26_2$ offers also the following advantage. When the load acting on one $25_1$ of the externally toothed gears is increased, the angular bearing $26_1$ acts to displace the angular bearing $26_2$ outwardly, i.e., toward the output shaft 22, whereby the load on the externally toothed gear $25_2$ is increased. Thus, the above-mentioned face-to-face arrangement of the angular bearings $26_1$, $26_2$ provides an automatic centering function of the externally toothed gears $25_1$, $25_2$, so as to ensure an equal load distribution to both externally toothed gears $25_1$, $25_2$, thus eliminating any abnormal wear, as well as vibration and noise, attributable to uneven load distribution to these gears.

The embodiment described hereinbefore is only illustrative and the invention can be applied to various internal meshing type planetary gear mechanisms, and all such applications are within the scope of the present invention.

As will be understood from the foregoing description, the present invention offers the following advantages.

The moment acting on the eccentric shaft can be stably born in lateral directions by the thrust bearings. Furthermore, partly because the eccentric shaft and the input shaft are coupled by a radially displaceable flexible coupling mechanism, and partly because radial load acting on the input shaft is eliminated, it is possible to remarkably suppress vibration and noise attributable to oscillation of the input shaft and to reduce the size of bearings supporting the input shaft or to omit these bearings.

In addition, since the externally toothed gears are supported by angular bearings which are arranged in face-to-face relation, the lines indicating actions of these bearings are inclined to oppose each other, so that the span between the pair of externally toothed gears is materially shortened to reduce the moment. This face-to-face arrangement of the angular bearings serves such when the load on one of the externally toothed gear increases, the load on the other externally toothed gear is automatically increased, thus producing an automatic centering function. Consequently, load is equally distributed to both externally toothed gears, thus remarkably suppressing abnormal wear of these gears, as well as noise and vibration.

What is claimed is:

1. A planetary gear changing device comprising:
   an input shaft;
   eccentric members coupled to said input shaft through a flexible coupler which permits a relative radial displacement between said input shaft and said eccentric members;
   an externally toothed gear on each of said eccentric members;
   an internally toothed gear having internal teeth formed by outer pins and meshing with the teeth of said externally toothed gears on said eccentric members;
   inner pin receiving holes formed in said externally toothed gears;
   inner pins loosely received in said inner pin receiving holes;
   inner pin holder rings arranged on opposite outer sides of said externally toothed gears and having holes tightly receiving said inner pins;
   coupling means for coupling said inner pin holder rings to an output shaft; and
   thrust bearings bewteen each said inner pin holder rings and said eccentric members.

2. A planetary speed changing device according to claim 1, wherein said externally toothed gears are fitted on said eccentric members through angular bearings arranged such that the lines of action of said angular bearings are in opposition to each other.

* * * * *